United States Patent [19]

Ettema et al.

[11] Patent Number: 4,642,940
[45] Date of Patent: Feb. 17, 1987

[54] TRELLIS STAKE AND WIRE SUPPORT TO BE USED IN CONNECTION WITH SUCH A TRELLIS STAKE

[75] Inventors: Ernst Ettema, Hardenberg; Jan de Vries, Hilversum, both of Netherlands

[73] Assignees: Wavin B.V., Zwolle; Somevena B.V., Hilversum, both of Netherlands; a part interest

[21] Appl. No.: 667,562

[22] Filed: Nov. 2, 1984

[30] Foreign Application Priority Data

Nov. 2, 1983 [FR] France ................................. 38 17380

[51] Int. Cl.⁴ ........................ A01G 17/06; A01K 3/00
[52] U.S. Cl. .................................................... 47/44
[58] Field of Search ................. 52/155, 103, 647, 738, 52/309.15, 309.16; 256/19, 50, 51, 47, 48, 52, 256/53, 54, 56, 58; 47/44–47

[56] References Cited

U.S. PATENT DOCUMENTS

| | | | |
|---|---|---|---|
| 1,197,404 | 9/1916 | Simpson | 256/53 X |
| 1,637,645 | 8/1927 | Jones | 256/47 X |
| 2,202,013 | 5/1940 | Lougheed | 52/309.16 X |
| 2,447,228 | 8/1948 | Boston | 256/54 X |
| 2,802,644 | 8/1957 | Ferdinand et al. | 256/19 |
| 3,080,149 | 3/1963 | Pilboue | 256/19 X |
| 3,452,497 | 7/1969 | Warp | 52/309.16 X |
| 3,579,908 | 5/1971 | Morgan | 47/45 |
| 3,809,371 | 5/1974 | Martini | 256/47 |
| 3,820,758 | 6/1974 | Berg et al. | 256/47 X |
| 4,185,424 | 1/1980 | Streit | 135/118 |
| 4,194,338 | 3/1980 | Trafton | 52/738 X |
| 4,270,737 | 6/1981 | Binns et al. | 256/48 |
| 4,523,405 | 6/1985 | Madonia | 47/47 |

FOREIGN PATENT DOCUMENTS

| | | | |
|---|---|---|---|
| 235539 | 7/1959 | Australia | 52/309.16 |
| 1053002 | 4/1979 | Canada | 47/47 |
| 2273143 | 1/1976 | France | 256/19 |
| 2430192 | 3/1980 | France | 47/47 |
| 1404327 | 8/1978 | United Kingdom | 47/47 |

*Primary Examiner*—Robert A. Hafer
*Assistant Examiner*—Danton DeMille
*Attorney, Agent, or Firm*—Wilkinson, Mawhinney & Theibault

[57] ABSTRACT

The invention relates to a plastic trellis stake for supporting rows of tensioned wires 12, more particularly for supporting grape vines in vineyards, a wire support to be used in connection with this trellis stake, said stake having been provided with ribs 1a, 1b forming protuberances.

A clamp 6, 7 of the wire support 5 comprises a part 6, forming seats for the protuberances of ribs 1a, 1b of the stake, and another part 7 being provided with hooks 11 for wires 12 and enclosing free ends 8 of that part 6 of the clamp.

The trellis stake and the wire support are destined for supporting tendrils and twigs of plants, more particularly, grape vines in vineyards.

7 Claims, 3 Drawing Figures

TRELLIS STAKE AND WIRE SUPPORT TO BE USED IN CONNECTION WITH SUCH A TRELLIS STAKE

BACKGROUND OF THE INVENTION

The present invention relates to a plastic trellis stake for rows of tensioned wires for supporting tendrils and twigs of plants, more particularly, grape vines in vineyards.

The invention in another aspect also relates to a wire support to be used in connection with such a trellis stake, a support member for the wire being part of a fastening clamp to be disposed around a trellis stake.

The dressing of grape vines in vineyards is very labourious and for this reason instead of separately fastening the grape vine to a single stake, grape vines are fastened in rows along tensioned wires. With respect to mechanisation in vine dressing in vineyards, wires in a trellis have to be very accurately tensioned. For this reason the trellis stakes for supporting the wires have to be very accurately lined out.

Given an amount of about 5000 grape vines pro hectare for farming the ground and to facilitate gathering the grapes, the trunks of grape vines are to be guided upwardly towards a lower tensioned wire which generally is called the bending wire. Depending on the way of guiding the tendrils, a second bending wire can be situated above the first one while furthermore a double fastening wire is used, mostly followed by two or three single fastening wires, until a trellis height is obtained of about 1.80 m.

In modern vineyards the plots generally have a maximum wire length between 50 to 60 meters their mutual position depending on the kind of grape vine and the way in which the tendrils are to be guided. It is therefore necessary that the level of the wires can be adjusted along the stake.

Considering the life time of the vineyard and the possible exhaustion of the ground, the age of a grape vine is about 20 years before the quality of the grapes and the yields will decrease. This means that a trellis stake has to last about 20 years, although a multiple of said amount is preferred. A good alignment of the trellis stake and straight trunks of the grape vines are especially of importance with respect to a mechanical gathering of grapes, although such a mechanical gathering of grapes was hitherto not entirely satisfactory.

By arranging vineyards in the way as described above a reduction of more than 50% of the costs of dressing the grape vines is obtained. Regarding the number of trellis stakes it should be noted that in one trellis the distance between the stakes is about 4 to 5 meters. For mechanisation the space between the rows of trellis stakes is increased, the spaces then being about 2 to 2.80 m. wide. In addition a great sturdiness of the stake is necessary in view of gales and possible squalls, especially when the tendrils are in full foliage.

In practice very often wooden trellis stakes are used which stakes have been impregnated in order to prevent wood rot. Wooden stakes are very easy to handle and the wires can be simply fastened to the stakes by means of clamps or eyes. Plastic hooks fastened to the stake by a nail, are also often used. The advantage of such hooks is that the double fastening wires, during growing of the foliage and new tendrils, can be easily hooked out and hooked in again, while enclosing the foliage, so protecting fresh tendrils against winds and avoiding their being pressed aside and getting drooped. However, wooden stakes are not fully weather-proof and during a period of, f.i., 20 years it often happens that such stakes rot near the ground, causing the trellis stake to get out of line by winds or even to get broken.

Trellis stakes made of pre-stressed concrete are also known in the art. These stakes comprise at either side rows of grooves into which grooves plastic eyes are inserted for supporting the wires. Trellis stakes of concrete, however, are very heavy and difficult to handle and frost can affect the quality of the concrete, while the stake can even be broken by frozen water accumulated in a crack or groove in the stake.

Steel trellis stakes are also known in the art, having a C-shaped cross-section, with hooks punched out at the opposing sides of the stake. These stakes are made corrosion-proof by galvanisation. It often happens, however, that said galvanisation is damaged by tools, particularly at end stakes, with the result that the stakes yet become rusty and a long life of 20 years cannot possibly be obtained.

In practice efforts have been made to make plastic stakes, but up till now these are unseccessful as plastic stakes generally are too weak, unless the stake diameter is large. As the number of stakes compared with the number of grape vines pro hectare is considerably high, increasing the stake diameter is disadvantageous with respect to causing shadows. During the month of September, so just before gathering the grapes of the late kind, each day of sunlight increases the amount of sugar in one grape by 1° Oechsele (0.3° Briggs). This means that shadows caused by stakes result in wines from grapes of which the quality is considered to be slightly inferior to that obtained in normal cases (i.e. in the absence of shadows).

Trellis stakes made of tubular plastic material are also known, as well as a plastic wire support material which is to be fastened around the tubular stake. To avoid shadows caused by the stake(s) it has been tried to make rigid plastic stakes having a profiled cross-sectional shape, e.g. a T-shaped cross-section. However, wire supports are to be slid around a stake and have to be fastened in the correct position. It is therefore a drawback of the latter stakes that a wire support can be damaged, as a result of the yearly trimming which is mostly performed with pneumatically driven pruning-shears. As a consequence wire supports situated thereabove have to be moved to a lower position and a new wire support for the uppermost wire is to be supplied, which is very time-consuming. In case a wire is cut through by a pruning shear, this is less disadvantageous, because the wire can easily be connected again by an intermediate part of wire.

SUMMARY OF THE INVENTION

It is an object of the present invention to eliminate the aforesaid drawbacks and to provide a plastic trellis stake which is extremely weather-proof, has a great strength and gives only a small amount of shadow.

This is effected according to the invention in that a plastic trellis stake is provided with ribs forming protuberances running in the longitudinal direction of the stake, preferably at the edges of flanges running in the longitudinal direction of said stake. Reinforcing threads are situated within the ribs, whereas reinforcing threads are also embedded in the plastic material over the entire cross-section of the stake comprising additional reinforcing threads situated in protuberances of the ribs. The stake can be easily made from fiber-reinforced thermosetting plastic material. A wire support to be used at such a trellis stake according to the invention, is characterized in that a part of a clamp provided with one or more seats for protuberances of the ribs of the stake has a configuration which allows it to exert a pinching action on the protuberances of the ribs situated in the seats when this part is fastened to another part of the clamp. According to the invention this support is formed of two parts and free ends of the part of the clamp, provided with one or more seats which co-operate with wedge faces of the other part of the clamp, said wedge faces being slid around said free ends. The result of this is that, when the clamp gets damaged it can be simply removed from the stake without displacement of other wire supports. The wire support can also be placed at every desired level on the stake which can be performed very accurately when it is to be preferred that the double fastening wires are not to be unhooked, but are to be shifted upwards together with the growing foliage. One portion of the clamp is provided with one or more hooks for supporting a wire.

The advantage of the invention is that now very strong trellis stakes can be obtained with comparatively small cross-sectional dimensions, the fastening wires and the bending wire of which can be positioned at any desired level.

SURVEY OF THE DRAWINGS

DESCRIPTION OF THE PREFERRED EMBODIMENTS

Figure 1:
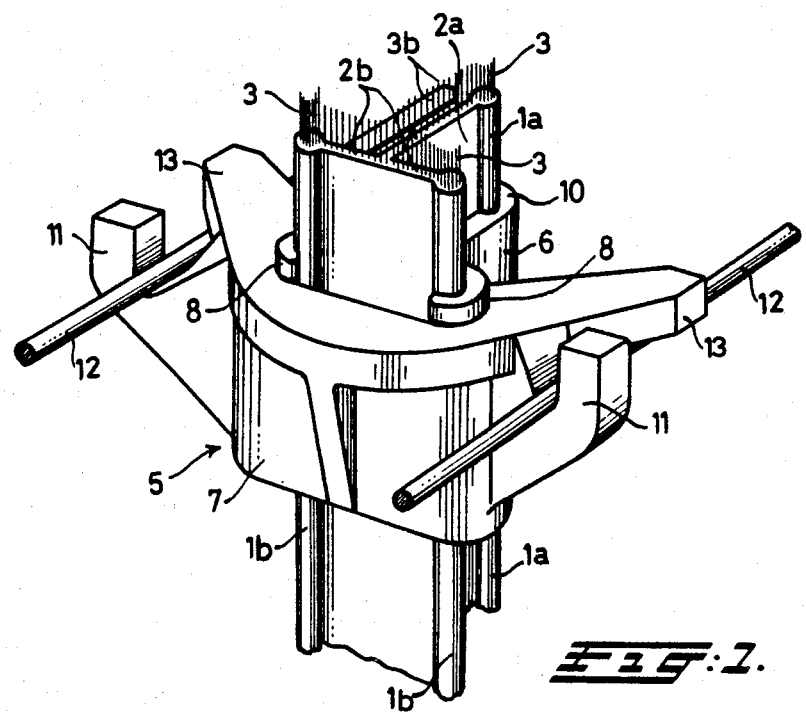
FIG. 1 is a perspective view of part of a trellis stake with a wire support fastened thereto.

According to the invention a plastic trellis stake made of fiber-reinforced material is provided with ribs 1a and 1b, forming protuberances running in longitudinal direction. The ribs forming protuberances are edges of flanges 2a and 2b running in longitudinal direction of the stake. As the plastic stake is made of fiber-reinforced material, reinforcing threads 3 are provided in the protuberances of the ribs. However, reinforcing threads can also be embedded over the entire cross-section of the stake as indicated by reference numeral 3b, whilst in the protuberances of the ribs additional reinforcing threads have also been embedded. As appears from the drawing the protuberances of the ribs have been situated at that point with regard to the cross-section of the stake, where the distance from the outermost fiber layer to the neutral line of a given moment of resistance, is always the utmost. It will be evident that a trellis stake which is designed for withstanding the forces applied onto it, can, in a smaller size, also be used as a picket for straightening the trunk of a grape vine, as it is ensured, due to its great resistance that the trunk will be retained in a straight manner whilst, owing to this flat part at the flanges 2b, it will not damage the trunk.

Figure 2:
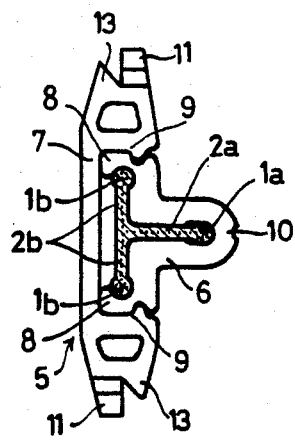
FIG. 2 is a cross-section of a trellis stake with a top plan view of a wire support.
Figure 3:
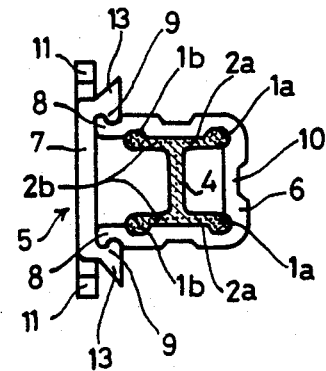
FIG. 3 is a similar cross-section with wire support as shown in FIG. 2 but in modified embodiment.

The wire support generally referenced 5, is also made of plastic and comprises a clamp to be situated around the trellis stake, one part 6 of the clamp comprises one or more seats for the protuberances of the ribs 1a and 1b, and has a configuration which allows it to exert a pinching action on the protuberances 1a, 1b of the ribs situated in the seats, when this part 6 is fastened to the other part 7 of the clamp. The seats are formed at least partly complementary to the protuberances of the ribs of the stake and, in a tensioned condition of the clamp, the seats lay tightly around the protuberances. The clamp is formed of two separate parts 6, 7 and free ends 9 of part 6 of the clamp and provided with one or more seats, co-operating with wedge faces of the other part 7 of the clamp and which can be diverged on the free ends of part 6 (FIG. 2). The angle of inclination of the wedge faces is such that these faces are self-locking and will therefore not get disengaged when a small pressure is exerted, opposed to the closing pressure for the clamp. The wedge faces are positioned in such a manner that, when exerting a downward force on part 7, this force will cause an increasing clamping action. The shape of the wedge faces need not be explained because this will be evident, as the wedge face at the free ends 8 of part 6 of the clamp and the engaging faces 9 of part 7 diverge in a downward direction. Part 6 of the clamp provided with seats is made of resilient plastic material, part 7 of the clamp embracing the ends 8 is made of rigid plastic material so as to retain its shape. Part 6 comprising seats of thermoplastic material is provided with a weakened portion 10 in the middle of the clamp, for bending open and closing this portion (FIG. 3). Weakened portion 10 can be considered to be a hinge during closing the clamp, owing to which a great pinching force is exerted on the protuberances 1a and 1b. Form-stabile part 7 of the clamp comprises one or more hooks 11 for engaging a wire 12. Nearby hook 11 a cam 13 is provided for keeping the wire down within the hook. This is of importance to prevent the wire from getting lifted out of the hook in case gusts of wind are exerted on the grape vine with its foliage, but, more particularly, during mechanical grape gathering, which operation entails a plurality of machine fingers, moving rapidly in an upward and downward manner along the trellis for shaking the grapes from the tendrils. Cam 13 laterally projects from the top of hook 11 which is of importance in case the trellis stakes are situated on a steep slope, as the wire needs then not to be bent and can be easily stretched. Cam 13 is in that event to be situated at the lower side of the slope. The trellis stake can be used as end stake and an additional wire support is used for sliding therearound an anchoring wire for the end stake.

Considering the above, there is provided according to the invention an assembly of a trellis stake with a wire support, which stake is provided with a number of wire supports 5 a part 6 of each wire support having a cross-sectional shape adapted to the cross-section of the stake and having a configuration for enclosing the ribs of the stake provided with protuberances.

What is claimed is:

1. A two piece wire support for use with a trellis stake for receiving rows of tensioned wires for supporting grape vines and the like wire support means comprising, a first flexible plastic support having free ends snap fit and positioned selectively along the major axis externally of said stake, wedge means carried by said first plastic support externally thereof, a second rigid plastic tensioned wire support having an open mouthed wedge means positioned internally thereof and opening rearwardly of said stake and being complemental to and receivable over the wedge means carried externally by said first flexible plastic support, at least one wire hook and wire support means on said second rigid plastic support positioned thereon to receive and retain at least one tensioned wire to prohibit disengagement of the tensioned wire from said first and second plastic supports and trellis stake without any wrapping and flexible locking member to retain the tensioned wire in the hook of said wire support means, said first flexible plastic support forming a resilient clamp of two parts each receivable about the external configuration of the cross-section of said stake to position the clamp along the axis of said stake and said free ends of said clamp being tapered from top to bottom transversely of the cross-section of said resilient clamp and said rigid plastic wire support has an open wire support hook to each side of said open mouth wedge to support a tensioned wire on each side of said stake and cam means carried by said rigid plastic wire support above the bottom of said open wire support hooks for directing the tensioned support wires into the open end of said hooks.

2. A two piece wire support for use with a plastic trellis stake having a T-shaped horizontal cross-section with protuberances at all three free ends of the T-shape running in the longitudinal direction of the stake for receiving rows of tensioned wires for supporting tendrils and twigs of plants, a two piece wire support, said first piece comprising a resilient plastic substantially T-shape in cross-section having a T-shaped recess and having curled arms on the upper ends of the T-shape directed inwardly to grasp the protuberances on the free ends of the T-shape of the T-shaped stake, the closed portion of the T being receivable over the protuberance of the base leg of the T-shaped stake, said first piece being tapered from top to bottom outwardly and downwardly through the upper ends of the curled arms, said first piece being resiliently engageable about the stake so that the curled arms will hold the first piece to the stake and, the second piece being of rigid plastic having an open end mouth having constricted tapered end portions tapering outwardly and downwardly to form a slide wedge fit between said first and second piece, and said second piece being provided with at least one hook having a cam for supporting a wire and means for keeping the wire within the hook.

3. A wire support as claimed in claim 1 wherein said open mouth wedge means on said rigid plastic support means has an open mouth to permit it to pass about the stake and having downwardly and outwardly flared walls to form a wedge support with the outwardly and downwardly flared free ends of said resilient clamp to lock said rigid wire support to said resilient clamp to restrain opening of said clamp and rigidly anchoring said rigid plastic support to said resilient plastic clamp.

4. A tensioned wire support as claimed in claim 3 wherein said stake is of T-shape cross-section whose ribs have protuberances at their extremities which co-operate with the flexible plastic support to anchor it to said stake.

5. A trellis as claimed in claim 4, further comprising reinforcing threads running in an axial direction of the stake and positioned in the protuberances of the ribs.

6. A trellis stake as claimed in claim 4, wherein said reinforcing threads running in an axial direction of the stake are embedded in the plastic material over the entire cross-section of the stake comprising additional reinforcing threads in the protuberances of the ribs.

7. A trellis stake as claimed in claim 4, wherein said stake comprises a fiber-reinforced thermo-setting plastic material and the fibers run in the axial direction of the stake.

* * * * *